US012424686B2

(12) United States Patent
Park et al.

(10) Patent No.: US 12,424,686 B2
(45) Date of Patent: Sep. 23, 2025

(54) SECONDARY BATTERY

(71) Applicant: Samsung SDI Co., Ltd., Yongin-si (KR)

(72) Inventors: Gun Gue Park, Yongin-si (KR); Hyun Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 636 days.

(21) Appl. No.: 17/808,084

(22) Filed: Jun. 21, 2022

(65) Prior Publication Data

US 2023/0006291 A1 Jan. 5, 2023

(30) Foreign Application Priority Data

Jun. 30, 2021 (KR) ........................ 10-2021-0085717

(51) Int. Cl.
*H01M 50/152* (2021.01)
*H01M 10/0525* (2010.01)
*H01M 50/107* (2021.01)
*H01M 50/533* (2021.01)
*H01M 50/538* (2021.01)
(Continued)

(52) U.S. Cl.
CPC ..... *H01M 50/152* (2021.01); *H01M 10/0525* (2013.01); *H01M 50/107* (2021.01); *H01M 50/533* (2021.01); *H01M 50/538* (2021.01); *H01M 50/474* (2021.01);
(Continued)

(58) Field of Classification Search
CPC ........... H01M 10/0525; H01M 50/107; H01M 50/152; H01M 50/474; H01M 50/533; H01M 50/538; H01M 50/545; H01M 50/548; H01M 50/559; Y02E 60/10
See application file for complete search history.

(56) References Cited

U.S. PATENT DOCUMENTS 8,557,430 B2    10/2013  Byun et al.
9,136,538 B2     9/2015  Byun et al.
(Continued)

FOREIGN PATENT DOCUMENTS

EP     3 696 874 A1    8/2020
JP       4524982 B     5/2004
(Continued)

OTHER PUBLICATIONS

Machine translation of JP2004139777A (Year: 2025).*
(Continued)

*Primary Examiner* — Lingwen R Zeng
(74) *Attorney, Agent, or Firm* — Womble Bond Dickinson (US) LLP

(57) ABSTRACT

A secondary battery including a cylindrical can, an electrode assembly in the cylindrical can and including a plurality of first substrate tabs extending from one side of the electrode assembly along a longitudinal direction of the cylindrical can, and a plurality of second substrate tabs extending from an opposite side of the electrode assembly along the longitudinal direction of the cylindrical can; a cap assembly for sealing the cylindrical can; a first current collector plate electrically connecting the plurality of first substrate tabs to the cylindrical can; and a second current collector plate insulated from the cylindrical can and electrically connecting the plurality of second substrate tabs to the cap assembly.

8 Claims, 5 Drawing Sheets

(51) Int. Cl.
*H01M 50/474* (2021.01)
*H01M 50/545* (2021.01)
*H01M 50/548* (2021.01)
*H01M 50/559* (2021.01)

(52) U.S. Cl.
CPC ........ *H01M 50/545* (2021.01); *H01M 50/548* (2021.01); *H01M 50/559* (2021.01); *Y02E 60/10* (2013.01)

(56) References Cited

U.S. PATENT DOCUMENTS

| | | |
|---|---|---|
| 2005/0277020 A1 | 12/2005 | Cheon et al. |
| 2010/0216001 A1 | 8/2010 | Byun et al. |
| 2014/0017565 A1 | 1/2014 | Byun et al. |
| 2020/0235369 A1 | 7/2020 | Jeong et al. |
| 2021/0210792 A1* | 7/2021 | Mukai ................. H01M 50/528 |
| 2022/0255204 A1 | 8/2022 | Chun et al. |

FOREIGN PATENT DOCUMENTS

| | | |
|---|---|---|
| KR | 10-1361193 B1 | 10/2008 |
| KR | 10-1023865 B1 | 9/2010 |
| KR | 10-2019-0040699 | 4/2019 |
| WO | WO 2021020743 A1 | 2/2021 |

OTHER PUBLICATIONS

Extended European Search Report for Application No. 22182030.1, mailed Dec. 18, 2022, 8 pages.
Korean Office action for Application No. 10-2021-0085717, mailed Nov. 11, 2022, 5 pages.

* cited by examiner

SECONDARY BATTERY

CROSS-REFERENCE TO RELATED APPLICATION

This application claims priority to and the benefit of Korean Patent Application No. 10-2021-0085717 filed on Jun. 30, 2021 in the Korean Intellectual Property Office, the entire content of which is incorporated by reference herein.

BACKGROUND

1. Field

Embodiments of the present disclosure relate to a secondary battery.

2. Description of the Related Art

Lithium ion secondary batteries are used, for example, as power sources for hybrid or electric vehicles, as well as for portable electronic devices because of their advantages of high operating voltage and high energy density per unit weight.

Such secondary batteries may be classified into cylindrical, prismatic, or pouch types in shape. By way of example, cylindrical secondary batteries generally consist of a cylindrical electrode assembly, a cylindrical can to which the electrode assembly is coupled, an electrolyte that is injected into the can to enable movement of lithium ions, and a cap assembly that is coupled to one side of the can to prevent leakage of the electrolyte and to prevent separation of the electrode assembly.

The above information disclosed in this Background section is only for enhancing understanding of the background of the present disclosure and therefore it may contain information that does not constitute prior art.

SUMMARY

One or more embodiments of the present disclosure provide a secondary battery capable of preventing (or substantially preventing) separation phenomena from occurring at a welding region between an electrode assembly and a current collector plate, a welding region between a current collector plate and a can, and/or a welding region between a current collector plate and a cap assembly, when vibration or impact is applied.

A secondary battery according one or more embodiments of the present disclosure may include: a cylindrical can; an electrode assembly in the cylindrical can and including a plurality of first substrate tabs extending from one side of the electrode assembly along a longitudinal direction of the cylindrical can, and a plurality of second substrate tabs extending from an opposite side of the electrode assembly along the longitudinal direction of the cylindrical can; a cap assembly sealing the cylindrical can; a first current collector plate electrically connecting the plurality of first substrate tabs to the cylindrical can; and a second current collector plate insulated from the cylindrical can and electrically connecting the plurality of second substrate tabs to the cap assembly.

In one or more embodiments, the first current collector plate may include: a circular first base member; a plurality of first cantilever beams each of which has one end fixed to a periphery of the first base member and another end that extends inwardly and to which the plurality of first substrate tabs is welded; and a first center portion at the center of the first base member and welded to the cylindrical can.

According to one or more embodiments of the present disclosure, when vibration or impact is applied, the moving direction of welding regions between the first substrate tabs of the electrode assembly and the first cantilever beams of the first current collector plate, and the moving direction of a welding region between the first center portion of the first current collector plate and the cylindrical can, may be different from each other (may move independently of each other), thereby preventing (or substantially preventing) the separation phenomena of the welding regions.

In one or more embodiments, a first slit between the first base member and the first cantilever beams may be further included.

According to one or more embodiments of the present disclosure, by including the first slit, the other end of each of the first cantilever beams can move more freely, thereby more effectively preventing (or substantially preventing) the separation phenomenon of the first current collector plate against (or at) the welding regions.

In one or more embodiments, the first cantilever beams may have a horseshoe shape, and the first slit may have a C shape.

In one or more embodiments, the second current collector plate may include: a circular second base member; a plurality of second cantilever beams each of which has one end fixed to a periphery of the second base member and another end that extends inwardly and is free and to which the plurality of second substrate tabs is welded; and a second center portion at the center of the second base member and to which a lead tab connected to the cap assembly is welded.

According to these embodiments of the present disclosure, when vibration or impact is applied, the moving direction of welding regions between the second substrate tabs of the electrode assembly and the second cantilever beams of the second current collector plate, and the moving direction of a welding region between the second center portion of the second current collector plate and the cap assembly (lead tab), may be different from each other (may move independently of each other), thereby preventing (or substantially preventing) the separation phenomena of the welding regions.

In one or more embodiments, a second slit between the second base member and the second cantilever beams may further be included.

According to these embodiments of the present disclosure, by including the second slit, the other end of each of the second cantilever beams can move more freely, thereby more effectively preventing (or substantially preventing) the separation phenomena of the second current collector plate against (or at) the welding regions.

In one or more embodiments, the second cantilever beams may have a horseshoe shape, and the second slit may have a C shape.

In one or more embodiments, the second base member may further include an insulating layer at a sidewall of the cylindrical can to insulate the second base member from the cylindrical can.

According to one or more embodiments of the present disclosure, by including the insulating layer, unwanted electrical connection between the second current collector plate and the cylindrical can may be prevented (or substantially prevented).

DETAILED DESCRIPTION

Figure 1A:
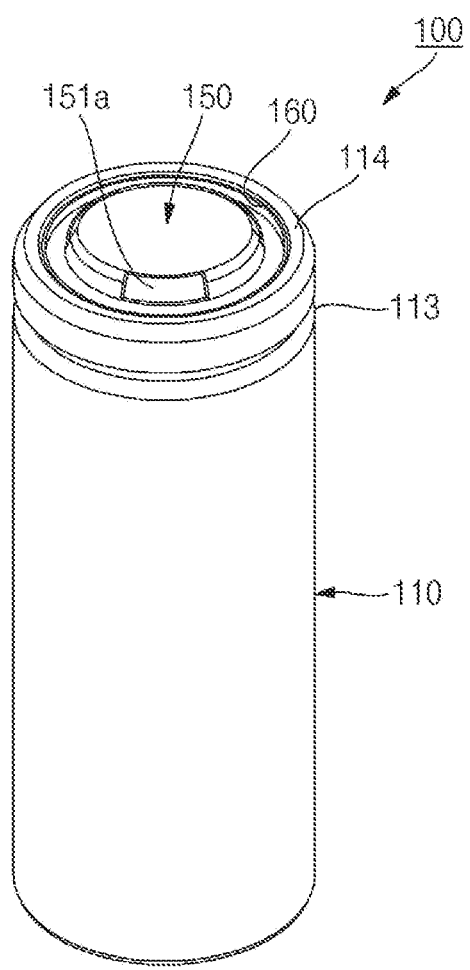
FIGS. 1A, 1B, and 1C are a perspective view, a cross-sectional view, and an exploded perspective view, respectively, illustrating a secondary battery according to one or more embodiments of the present disclosure.

Hereinafter, embodiments of the present disclosure will be described in detail with reference to the accompanying drawings.

Examples of the present disclosure are provided to more completely explain the present disclosure to those skilled in the art, and the following examples may be modified in various other forms. The present disclosure, however, may be embodied in many different forms and should not be construed as being limited to the example (or exemplary) embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "on," "connected to," or "coupled to" an element B, the element A can be directly on, connected to, or coupled to the element B, or an intervening element C may be present therebetween such that the element A and the element B are indirectly on, connected to, or coupled to each other. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise," "include," "comprising," and/or "including," when used in this specification, specify the presence of stated features, numbers, steps, operations, elements, and/or components, but do not preclude the presence or addition of one or more other features, numbers, steps, operations, elements, components, and/or groups.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
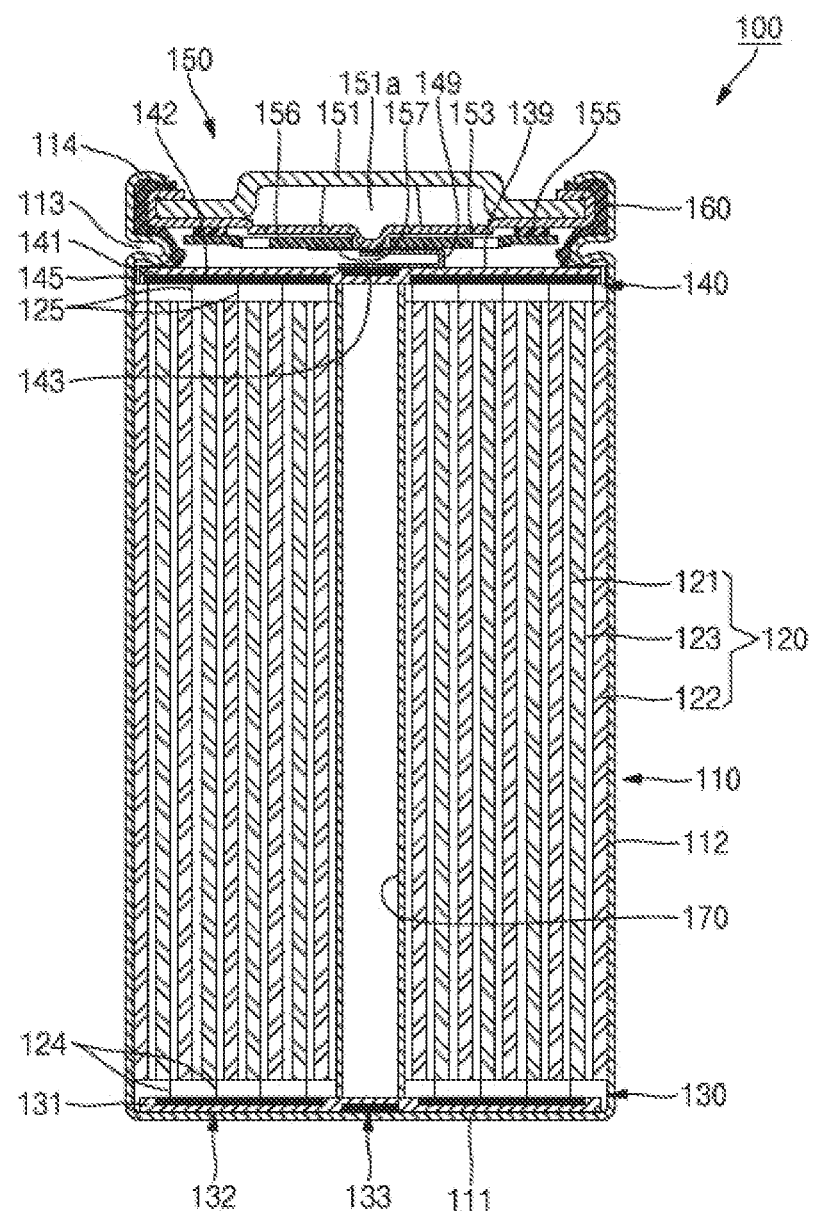
Figure 1C:
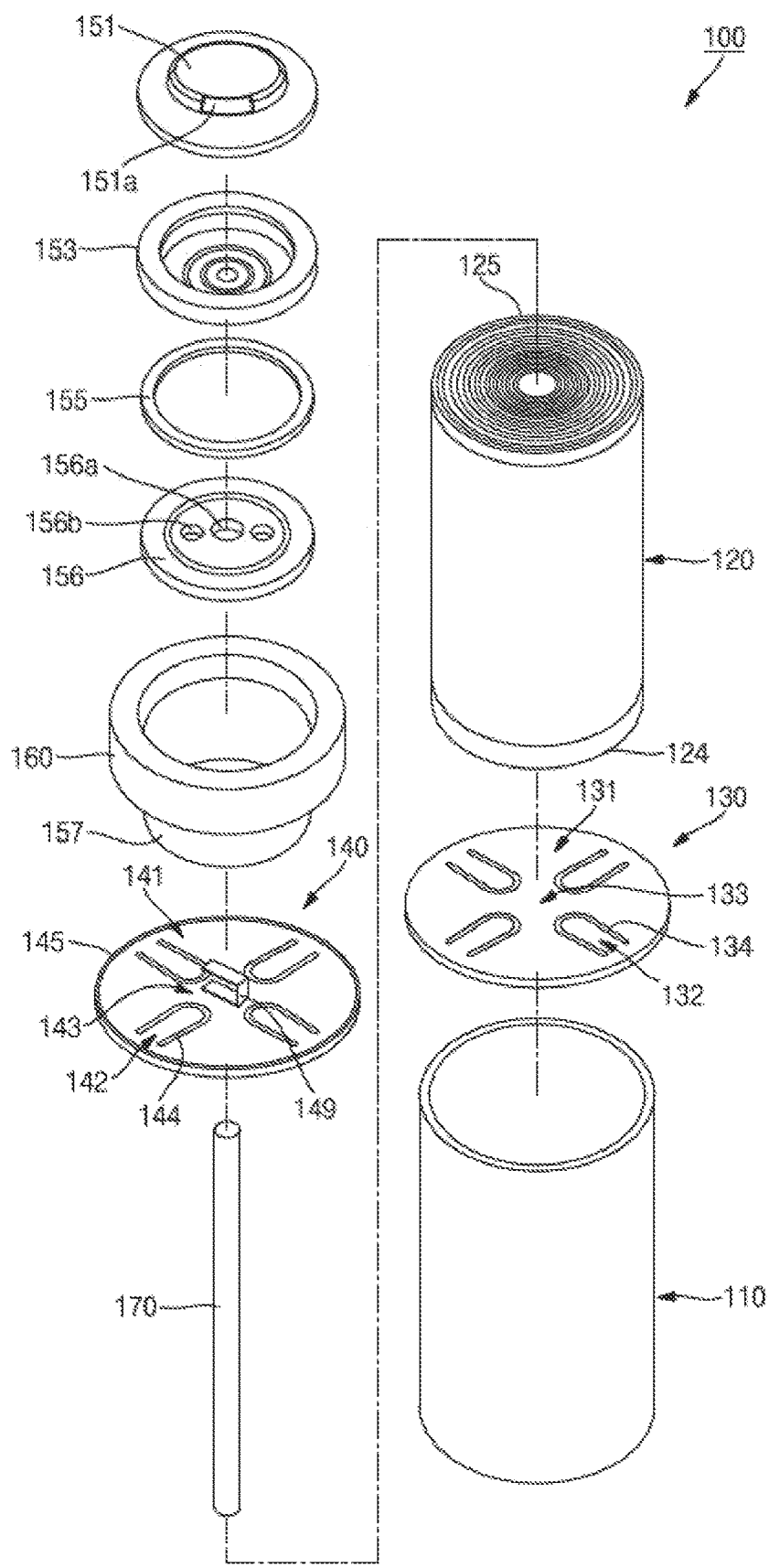
Figure 2:
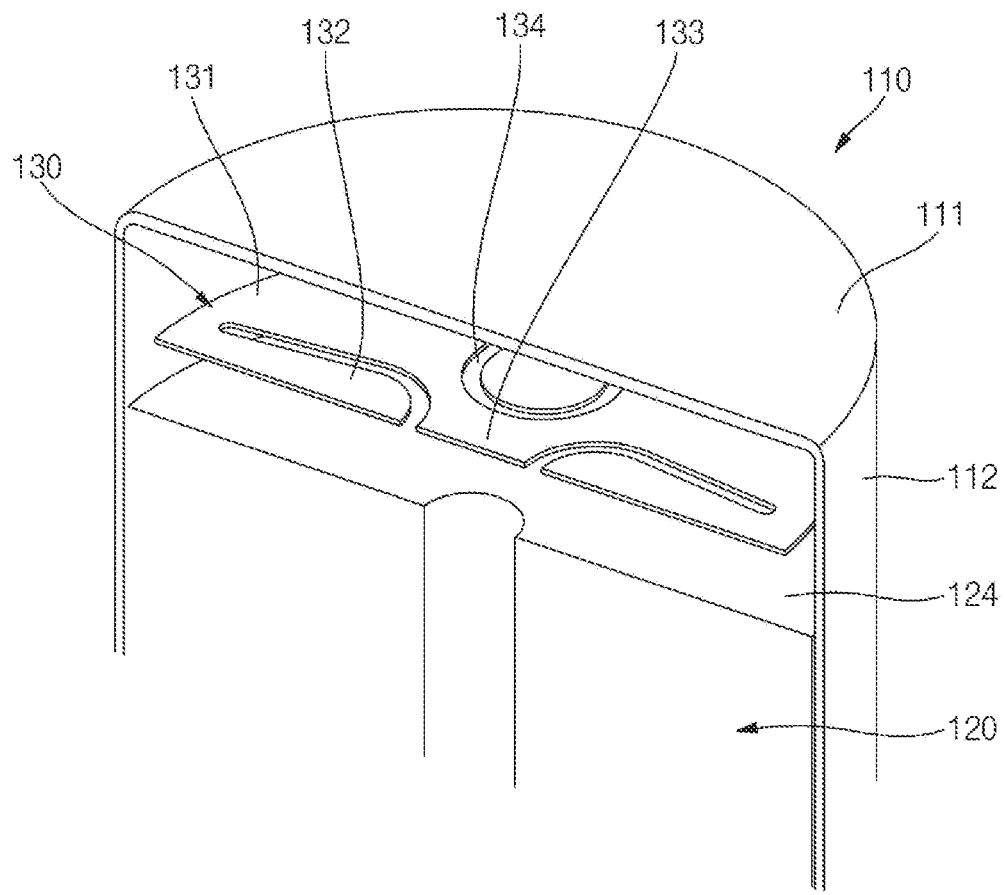
FIG. 2 is a cutaway perspective view illustrating a portion of a secondary battery according to one or more embodiments of the present disclosure.

FIGS. 1A, 1B, and 1C are a perspective view, a cross-sectional view, and an exploded perspective view, respectively, illustrating a secondary battery according to one or more embodiments of the present disclosure, and FIG. 2 is a cutaway perspective view illustrating a portion of a secondary battery according to one or more embodiments of the present disclosure.

In the example shown in FIGS. 1A, 1B, 1C and 2, the secondary battery 100 may include a cylindrical can 110, a cylindrical electrode assembly 120, a first current collector plate 130, a second current collector plate 140, and a cap assembly 150.

In one or more embodiments, the secondary battery 100 may further include an insulation gasket 160 that insulates the cylindrical can 110 and the cap assembly 150. In one or more embodiments, the secondary battery 100 may further include a center pin 170 (optional) coupled to the electrode assembly 120.

The cylindrical can 110 may include a substantially circular bottom portion 111 and a side portion 112 extending in an upper direction from the bottom portion 111 by a suitable (e.g., a predetermined) length. In one or more embodiments, the upper portion of the cylindrical can 110 may be open during an assembling process of a secondary battery. Accordingly, during the secondary battery assembling process, the electrode assembly 120, the first current collector plate 130, and the second current collector plate 140 may be integrated into one structure to then be inserted into the cylindrical can 110. In one or more embodiments, an electrolyte may be injected into the cylindrical can 110 at a later stage.

In one or more embodiments, the cylindrical can 110 may comprise or be referred to as a case, an external casing, or a housing. In one or more embodiments, the cylindrical can 110 may be provided with (or may include) steel, a steel alloy, nickel-plated steel, a nickel-plated steel alloy, aluminum, and/or an aluminum alloy. In one or more embodiments, the cylindrical can 110 may include a beading part 113 that is inwardly recessed at a lower portion of the cap assembly 150 and a crimping part 114 that is inwardly bent at an upper portion thereof to prevent (or substantially prevent) the cap assembly 150 from being separated to the outside.

The cylindrical electrode assembly 120 may be accommodated in the cylindrical can 110. The electrode assembly 120 may include a first electrode plate 121 coated with a first electrode active material (e.g., a negative active material, such as graphite, carbon, silicon, and/or other suitable material), a second electrode plate 122 coated with a second electrode active material (e.g., a transition metal oxide (a positive active material, such as $LiCoO_2$, $LiNiO_2$, $LiMn_2O_4$, and/or other suitable material), and a separator 123 that is positioned between the first electrode plate 121 and the second electrode plate 122 to prevent (or substantially prevent) an electric short circuit and to enable only movement of lithium ions. The first electrode plate 121, the second electrode plate 122, and the separator 123 may be wound in a substantially cylindrical shape in a stacked state. In one or more embodiments, the first electrode plate 121 may include a copper (Cu) and/or nickel (Ni) foil, and the second electrode plate 122 may include an aluminum (Al) foil. In one or more embodiments, the separator 123 may include polyethylene separator (PES), a polypropylene separator (PPS), a ceramic coated separator (CCS), a polymer coated separator (PCS), a multi-layer coated separator (MCS), and/or a multi-functional separator (MFS).

In one or more embodiments, a plurality of first substrate tabs 124 (e.g., negative electrode uncoated portion tabs) may be provided on (or at) the first electrode plate 121 to downwardly protrude and extend by a suitable (e.g., a predetermined) length, and a plurality of second substrate tabs 125 (e.g., positive electrode uncoated tabs) may be provided on (or at) the second electrode plate 122 to upwardly protrude and extend by a suitable (e.g., a predetermined) length. In one or more embodiments, the directions in which the first substrate tabs 124 and the second substrate tabs 125 protrude and extend may be the same as the longitudinal direction of the cylindrical can 110 and/or the cylindrical electrode assembly 120, and when the direction in which the first substrate tabs 124 protrude and extend is defined as a first direction, the direction in which the second substrate tabs 125 protrude and extend may be defined as a second direction opposite to the first direction. In one or more embodiments, the first substrate tabs 124 may comprise or be referred to as negative electrode uncoated portion tabs or negative electrode tabs. In one or more embodiments, the second substrate tabs 125 may comprise or be referred to as positive electrode uncoated portion tabs or positive electrode tabs. In one or more embodiments, the first substrate tabs 124 may include copper and/or nickel, and the second substrate tabs 125 may include aluminum.

In one or more embodiments of the present disclosure, the plurality of first substrate tabs 124 and the plurality of second substrate tabs 125 are provided on (or at) the electrode assembly 120, thereby providing a secondary battery enabling (or capable of having) low resistance and high output without capacity loss. In one or more embodiments, the first and second base tabs 124 and 125 are provided as the first and second uncoated portions without a substrate punching process, thereby preventing (or substantially preventing) deformation (i.e., reduction in roundness) or cracking of the electrode assembly 120.

In addition, the first substrate tabs 124 of the electrode assembly 120 may be electrically connected (e.g., welded) to the first current collector plate 130 to be described in more detail below, and the second substrate tabs 125 of the electrode assembly 120 may be connected to the second current collector plate 140 to be described in more detail below. In one or more embodiments, the first current collector plate 130 may be electrically connected to the cylindrical can 110, and the second current collector plate 140 may be electrically connected to the cap assembly 150. Therefore, the cylindrical can 110 may act as a negative electrode, and the cap assembly 150 may act as a positive electrode. Of course, the connection relationship may be reversed, and thus the cylindrical can 110 may act as a positive electrode and the cap assembly 150 may act as a negative electrode.

The first current collector plate 130 may electrically connect the plurality of first substrate tabs 124 provided in (or at) the electrode assembly 120 to the bottom portion 111 of the cylindrical can 110. In one or more embodiments, the first current collector plate 130 may comprise or be referred to as a first current collector or a first current collector member. In one or more embodiments, the first current collector plate 130 may comprise a first base member 131, a plurality of first cantilever beams 132, a first center portion 133, and a plurality of first slits 134, as shown, for example inf FIG. 1C.

The first base member 131 may be provided in a substantially disk shape.

Each of the first cantilever beams 132 may be provided such that one end is fixed to the periphery (e.g., the circumference) of the first base member 131 and the other end extending inward is free. In one or more embodiments, the first cantilever beams 132 may include a horseshoe shape in which the width of one end thereof is relatively small and the width of the other end is relatively large. In addition, the first substrate tabs 124 may be welded along the longitudinal direction of the first cantilever beams 132. In one or more embodiments, welding regions (e.g., regions for welding by laser beam) may be provided along the longitudinal direction of the first cantilever beams 132. In one or more embodiments, the first cantilever beams 132 may be arrayed at exterior sides of the first center portion 133, and the number thereof may be approximately 2 to 6.

The first center portion 133 may be provided roughly at the center of the first base member 131. The bottom portion 111 of the cylindrical can 110 may be welded to the first center portion 133. In one or more embodiments, welding regions (e.g., regions for welding by resistance welding or ultrasonic welding) may be provided in the first center portion 133.

The plurality of first slits 134 may be provided between the first cantilever beams 132 and the first center portion 133 in the first base member 131. In one or more embodiments, the first slits 134 may have an approximately C shape. In one or more embodiments, the first slits 134 may be provided along the periphery (e.g., the circumference) of the first cantilever beams 132 or may be provided along the periphery (e.g., the circumference) of the first center portion 133. In one or more embodiments, the plurality of first slits 134 may be provided at some regions of the first base member 131 by laser beams, a cutter, and/or a punch.

In one or more embodiments, the first current collector plate 130 may include aluminum, an aluminum alloy, nickel, a nickel alloy, copper, and/or a copper alloy.

The second current collector plate 140 serves to electrically connect the plurality of second substrate tabs 125 provided in (or at) the electrode assembly 120 to the cap assembly 150. In one or more embodiments, the second current collector plate 140 may comprise or be referred to as a second current collector or a second current collector member. In one or more embodiments, lead tabs 149 may be welded between the second substrate tabs 125 and the cap assembly 150. The second current collector plate 140 may include a second base member 141, a plurality of second cantilever beams 142, a second center portion 143, a plurality of second slits 144, and an insulating layer 145.

The second base member 141 may be provided in a substantially disk shape.

Each of the plurality of second cantilever beams 142 may be provided such that one end is fixed to the periphery (e.g., the circumference) of the second base member 141 and the other end extending inward is free. In one or more embodiments, the second cantilever beams 142 may include a horseshoe shape in which the width of one end thereof is relatively small and the width of the other end is relatively large. In addition, the plurality of second substrate tabs 125 may be welded along the longitudinal direction of the second cantilever beams 142. In one or more embodiments, welding regions (e.g., regions for welding by a laser beam) may be provided along the longitudinal direction of the second cantilever beams 142. In one or more embodiments, the second cantilever beams 142 may be arrayed at exterior sides of the second center portion 143, and the number thereof may be approximately 2 to 6.

The second center portion 143 may be provided roughly at the center of the second base member 141. Lead tabs 149 may be welded to the second center portion 143. In one or more embodiments, welding regions (e.g., regions for welding by ultrasonic energy) may be provided in the second center portion 143.

The plurality of second slits 144 may be provided between the second cantilever beams 142 and the second center portion 143 in the second base member 141. In one or more embodiments, the second slits 144 may include an approximately C shape. In one or more embodiments, the second slits 144 may be provided along the periphery (e.g., the circumference) of the second cantilever beams 142 or may be provided along the periphery (e.g., the circumference) of the second center portion 143. In one or more embodiments, the plurality of second slits 144 may be provided at some regions of the second base member 141 by laser beams, a cutter, and/or a punch.

The insulating layer 145 may be provided on (or at) the side surface of the second base member 141 and a partial region (e.g., a part) of the upper surface extending from the side surface. Therefore, the side surface of the second base member 141 may be insulated from the side portion 112 of the cylindrical can 110 by the insulating layer 145, and a partial region (e.g., a part) of the upper surface of the second base member 141 may be insulated from the beading part 113 of the cylindrical can 110. In one or more embodiments, the insulating layer 145 may include polyimide, polypropylene, polyethylene, and/or a metal oxide layer. In one or more embodiments, the insulating layer 145 may have a thickness of approximately 25 µm to 100 µm.

In one or more embodiments, the second current collector plate 140 may include aluminum, an aluminum alloy, nickel, a nickel alloy, copper, and/or a copper alloy. In one or more embodiments, when the second current collector plate 140 is made of aluminum, the insulating layer 145 may be an anodizing layer.

The cap assembly 150 may include a cap-up 151 provided with a plurality of through-holes 151a, a safety plate 153 installed under the cap-up 151, a connecting ring 155 installed under the safety plate 153, a cap-down 156 coupled to the connecting ring 155 and provided with first and second through-holes 156a and 156b, and a sub-plate 157 fixed to the lower portion of the cap-down 156 and electrically connected to the lead tabs 149.

The through-hole 151a provided in the cap-up 151 and the through-hole(s) 156b provided in the cap-down 156 serve to discharge the internal gas to the outside when an abnormal internal pressure occurs due to overcharging inside the cylindrical can 110. Of course, due to the internal pressure, the safety plate 153 is first inverted in the upward direction, and thus the safety plate 153 is electrically separated from the sub-plate 157, and then the safety plate 153 is ruptured and the gas inside is released to the outside.

In one or more embodiments, the insulation gasket 160 surrounds (or is around) the cap-up 151, the safety plate 153, the connecting ring 155, and the cap-down 156 in a substantially circular ring shape, and serves to electrically insulate the same from the side portion 112 of the cylindrical can 110. The insulation gasket 160 is configured to be substantially compressed between the beading part 113 provided on (or at) the side portion 112 and the crimping part 114 of the cylindrical can 110. In one or more embodiments, the insulation gasket 160 may include a heat-resistant resin. In one or more embodiments, the heat-resistant resin may include one or more selected from the group consisting of polypropylene (PP), polyethylene (PE), polyimide (PI), polybutyleneterephthalate (PBT), polycarbonate (PC), and polystyrene (PS).

The center pin 170 has a hollow circular pipe shape, and may be coupled to approximately the center of the electrode assembly 120. In one or more embodiments, the center pin 170 may be provided from (or may include) steel, a steel alloy, nickel plated steel, nickel plated steel alloy, aluminum, an aluminum alloy, and/or polybutylene terephthalate.

The center pin 170 may have a lower end in contact with the first center portion 133 of the first current collector plate 130, and an upper end in contact with the second center portion 143 of the second current collector plate 140. Here, in order to prevent (or substantially prevent) an electrical short from occurring between the first current collector plate 130 and the second current collector plate 140 due to the center pin 170, insulating layers may be further provided on (or at) the upper and lower ends of the center pin 170, respectively. The center pin 170 serves to suppress deformation of the electrode assembly 120 during charging and discharging of battery, and serves as a passage for gas generated inside the secondary battery 100. In one or more embodiments, the center pin 170 may be omitted.

In one or more embodiments, an electrolyte may be injected into the cylindrical can 110 that serves to enable the movement of lithium ions generated by an electrochemical reaction in (or at) the first electrode plate 121 and the second electrode plate 122 inside the battery during charging and discharging. The electrolyte may be a non-aqueous organic electrolyte that is a mixture of a lithium salt and a high-purity organic solvent. In one or more embodiments, the electrolyte may be a polymer using a polymer electrolyte or a solid electrolyte.

In one or more embodiments of the present disclosure, the first cantilever beams 132 of the first current collector plate 130 are welded to the first substrate tabs 124 of the electrode assembly 120, and the first center portion 133 of the first current collector plate 130 is welded to the bottom portion 111 of the cylindrical can 110, thereby preventing (or substantially preventing) a welding region (provided on (or at) the upper surface of the first cantilever beams 132) between the electrode assembly 120 and the first current collector plate 130 and/or a welding region (provided on (or at) the lower surface of the first center portion 133) between the cylindrical can 110 and the first current collector plate 130 from being separated when vibration or impact is applied to the secondary battery 100. In other words, the welding regions of the first cantilever beams 132 and the welding region of the first center portion 133 can freely move elastically/independently from each other, and thus the separation phenomena of the welding regions can be prevented (or substantially prevented).

In addition, in the present disclosure, the second cantilever beams 142 of the second current collector plate 140 are welded to the second substrate tabs 125, and the second center portion 143 of the second current collector plate 140 is welded to the cap assembly 150, thereby preventing (or substantially preventing) a welding region (provided on (or at) the lower surface of the second cantilever beams 142) between the electrode assembly 120 and the second current collector plate 140 and/or a welding region (provided on (or at) the upper surface of the second center portion 143) between the cap assembly 150 and the second current collector plate 140 from being separated when vibration or impact is applied to the secondary battery 100. In other words, the welding regions of the second cantilever beams 142 and the welding region of the second center portion 143 can freely move elastically/independently from each other, and thus the separation phenomena of the welding regions can be prevented (or substantially prevented).

Figure 3A:
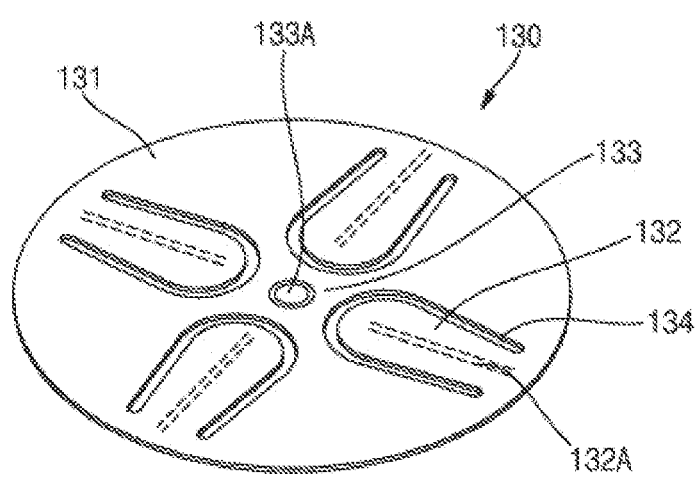
FIGS. 3A and 3B are perspective views illustrating a welding region and stress directions of a current collector in a secondary battery according to one or more embodiments of the present disclosure.
Figure 3B:
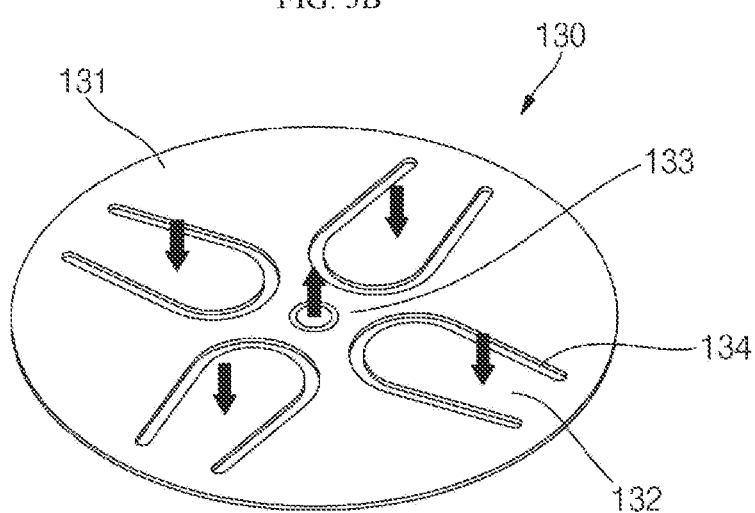

FIGS. 3A and 3B are perspective views illustrating a welding region and stress directions of a current collector in a secondary battery according to one or more embodiments of the present disclosure. Here, the first current collector plate 130 will be described by way of example.

In the example shown in FIG. 3A, the first current collector plate 130 includes a plurality of first cantilever beams 132 and one first center portion 133, and welding regions 132A and 133A may be provided in the first cantilever beams 132 and the first center portion 133, respectively. In one or more embodiments, the welding regions 132A may be provided along the longitudinal direction of the plurality of first cantilever beams 132 and thus can be fixed to the first substrate tabs 124 of the electrode assembly 120. In one or more embodiments, a welding region 133A may be provided in the center of the first center portion 133 to be fixed with the bottom portion 111 of the can 110.

In FIG. 3B, arrows indicate stress directions. In the example as shown in FIG. 3B, the first cantilever beams 132 and the first center portion 133 of the first current collector plate 130 may move in opposite directions. For example, the first cantilever beams 132 may move approximately in a downward direction, and the first center portion 133 may move approximately in an upward direction. This is because both the first cantilever beams 132 and the first center portion 133 have one end fixed along the periphery (e.g., the circumference) of the first base member 131. In other words, the first cantilever beams 132 have one end fixed to the peripheral area (e.g., the circumferential area) of the first base member 131, and the first center portion 133 having opposite regions fixed to the peripheral area (e.g., the circumferential area) of the first base member 131, and thus the first cantilever beams 132 and the first center portion 133 may move in opposite directions. In other words, the movement of the first cantilever beams 132 and the movement of the first center portion 133 do not interfere with each other. Accordingly, the separation phenomena of the welding regions 132A and 133A provided to the first cantilever beams 132 and the first center portion 133, respectively, may not occur or may rarely occur. The second current collector plate 140 may also operate in the same manner as the first current collector plate 130.

As described above, the present disclosure provides a secondary battery capable of preventing (or substantially preventing) the separation phenomena of a welding region between an electrode assembly and a current collector plate, a welding region between a current collector plate and a can, and/or a welding region between a current collector plate and a cap assembly, when vibration or impact is applied.

While the foregoing embodiments are described for carrying out the secondary battery according to the present disclosure, the present disclosure is not limited thereto, and it will be understood by a person skilled in the art that various changes in form and details may be made therein without departing from the spirit and scope of the present disclosure as defined by the following claims and their respective equivalents.

What is claimed is:

1. A secondary battery comprising:
   a cylindrical can;
   an electrode assembly in the cylindrical can and comprising a plurality of first substrate tabs extending from one side of the electrode assembly along a longitudinal direction of the cylindrical can, and a plurality of second substrate tabs extending from an opposite side of the electrode assembly along the longitudinal direction of the cylindrical can;
   a cap assembly sealing the cylindrical can;
   a first current collector plate electrically connecting the plurality of first substrate tabs to the cylindrical can; and
   a second current collector plate insulated from the cylindrical can and electrically connecting the plurality of second substrate tabs to the cap assembly,
   wherein the first current collector plate comprises:
     a circular first base member;
     a plurality of first cantilever beams, each having one end fixed to a periphery of the first base member and another end that is a free end extending inwardly and being free, the free ends of the plurality of first cantilever beams being welded to the plurality of first substrate tabs; and
     a first center portion at the center of the first base member and welded to the cylindrical can.

2. The secondary battery of claim 1, wherein the first current collector plate has a first slit between the first base member and one of the plurality of first cantilever beams.

3. The secondary battery of claim 2, wherein each of the plurality of first cantilever beams has a horseshoe shape, and the first slit has a C shape.

4. The secondary battery of claim 1, wherein the second current collector plate comprises:
   a circular second base member;
   a plurality of second cantilever beams, each of which has one end fixed to a periphery of the second base member and another end that extends inwardly and is free, the plurality of second cantilever beams being welded to the plurality of second substrate tabs; and
   a second center portion at the center of the second base member and to which a lead tab connected to the cap assembly is welded.

5. The secondary battery of claim 4, wherein the second current collector plate has a second slit between the second base member and one of the plurality of second cantilever beams.

6. The secondary battery of claim 5, wherein each of the plurality of second cantilever beams has a horseshoe shape, and the second slit has a C shape.

7. The secondary battery of claim 4, wherein the second base member further comprises an insulating layer at a sidewall of the cylindrical can to insulate the second base member from the cylindrical can.

8. The secondary battery of claim 1, wherein the first current collector plate has a plurality of first slits separating the plurality of first cantilever beams from the center of the first base member.

* * * * *